Dec. 13, 1927.
S. G. JENSEN
1,652,442
COMBINED EMERGENCY TIRE AND TOW LINE
Filed April 26, 1927
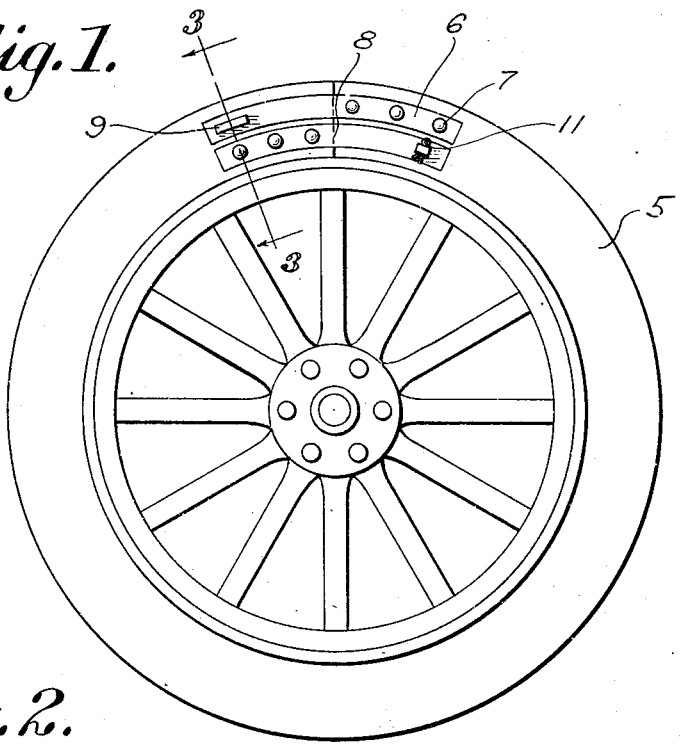
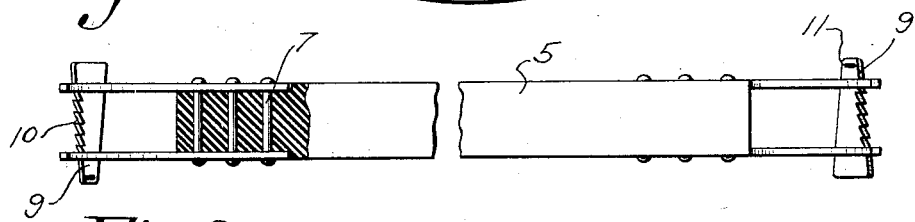
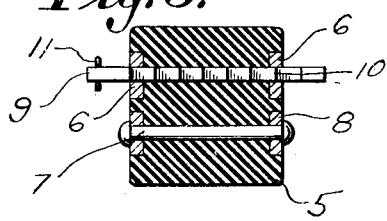
S. G. Jensen, Inventor Patented Dec. 13, 1927.

1,652,442

UNITED STATES PATENT OFFICE.

SOREN G. JENSEN, OF GREEN RIVER, WYOMING.

COMBINED EMERGENCY TIRE AND TOW LINE.

Application filed April 26, 1927. Serial No. 186,731.

The present invention has reference to an emergency device to be used by motorists, the device being so constructed that it may be employed as a tire, or as a tow line.

An object of the invention is to so construct the device that the fastening members at the ends thereof may be either brought together to secure the ends of the body portion together in such a way as to hold the body portion on a rim, or the fastening members may be employed for securing the ends of the body portion to motor vehicles when the device is employed as a tow line.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring to the drawing:

Figure 1 is an elevational view illustrating a device constructed in accordance with the invention as positioned on a rim as an emergency tire.

Figure 2 is a view illustrating the device partly in section and illustrating the manner of securing the fastening members to the body portion.

Figure 3 is a sectional view taken on line 3—3 of Figure 1.

Figure 4 is a modified form of body portion.

Referring to the drawing in detail, the device embodies an elongated body portion 5 constructed of any suitable flexible material such as layers of fabric and rubber moulded or vulcanized together, however in the present showing, the body portion is constructed of solid rubber.

As illustrated by Figure 3, the body portion is of rectangular cross section, however it is to be understood that the size and cross sectional contour may be changed without departing from the spirit of the invention.

The body portion is cut away at points adjacent to the ends thereof to receive the curved arms 6 which are arranged on opposite sides of the body portion and held to the body portion by means of the bolts or rivets 7 shown as passing through the body portion and arms 6.

These arms 6 are substantially long so that they extend appreciable distances beyond the end of the body portion to which they are secured.

Secured to the opposite end of the body portion are arms 8 which are arranged on opposite sides of the body portion and at points below the arms 6 so that as the ends of the body portion are brought together, the first mentioned arms will overlie the second mentioned arms insuring an efficient lock for locking the ends of the body portion together.

At points adjacent to the free ends of the arms 6 and 8, are openings especially designed to accommodate the wedge-shaped keys 9 that are formed with teeth 10 designed to engage within the openings and prevent reverse movement of the keys after they have been positioned, it being understood that the body portion is also formed with openings that fall opposite the openings of the arms, to the end that the keys will extend through the openings in the body portion, thereby fastening the ends together.

It may be found desirable to form transverse openings in the body portion as shown by Figure 4 of the drawing, thereby lending resiliency to the body portion, when the device is used as an emergency tire.

When the device is to be used as a tire the same is positioned on a rim in a manner as shown by Figure 1, the ends of the body portion being brought together and secured by means of the arms and keys in a manner as previously described.

Should it be desired to use the device as a tow line, the arms at the ends of the body portion may be positioned around an axle of a vehicle, over a spring or the like, and secured by means of the keys.

It might be further stated that cotter keys 11 are positioned in openings formed in the keys to insure against accidental displacement of the keys after they have been positioned.

The device may also be employed as a bumper, in which case, the device is positioned around the end of the vehicle and fastened in any suitable manner.

I claim:

1. In a device of the character described, an elongated body portion formed of elastic material and adapted to be positioned on a wheel rim, and fastening members carried by the body portion at the ends thereof, the fastening members at one end of the body portion overlying the fastening members at the other end of the body portion.

2. In a device of the character described, an elongated body portion constructed of elastic material, a pair of arms extending from each end of the body portion, the arms adapted to embrace portions of the body portion at the adjacent end thereof, and keys engaging the arms for securing the arms to the body portion.

3. In a device of the character described, an elongated body portion, a pair of arms secured to each end of the body portion, the free ends of the arms extending appreciable distances beyond the ends of the body portion, said arms having openings, the arms at one end of the body portion adapted to embrace portions of the opposite end of the body portion, and means for securing the arms in position.

4. In a device of the character described, an elongated body portion formed of resilient material, a pair of arms secured to each end of the body portion, the free ends of the arms extending beyond the ends of the body portion, the arms at one end of the body portion adapted to embrace portions of the opposite end of the body portion, said arms having openings adjacent to their free ends, and said body portion having openings to register with the openings of the arms, and wedge-shaped keys adapted to be positioned through the registering openings of the arms and body portion to secure the ends of the body portion together.

In testimony that I claim the foregoing as my own, I have hereto affixed my signature.

SOREN G. JENSEN.